(12) United States Patent
Kelly et al.

(10) Patent No.: US 8,876,348 B2
(45) Date of Patent: Nov. 4, 2014

(54) LIGHT FIXTURE COMPRISING A MULTI-FUNCTIONAL NON-IMAGING OPITICAL COMPONENT

(75) Inventors: Timothy Kelly, Brookline, MA (US); Matthew Sherman, Sharon, MA (US)

(73) Assignee: Fusion Optix, Inc, Woburn, MA (US)

( * ) Notice: Subject to any disclaimer, the term of this patent is extended or adjusted under 35 U.S.C. 154(b) by 204 days.

(21) Appl. No.: 13/562,304

(22) Filed: Jul. 30, 2012

(65) Prior Publication Data

US 2012/0287633 A1 Nov. 15, 2012

Related U.S. Application Data

(63) Continuation-in-part of application No. 12/030,203, filed on Feb. 13, 2008, now Pat. No. 8,231,256.

(60) Provisional application No. 60/889,525, filed on Feb. 2, 2007.

(51) Int. Cl.
*F21V 13/04* (2006.01)
*F21V 3/04* (2006.01)
*F21V 8/00* (2006.01)
*F21Y 101/02* (2006.01)

(52) U.S. Cl.
CPC ......... *F21V 3/0445* (2013.01); *F21V 2008/008* (2013.01); *F21V 3/0454* (2013.01); *F21V 2008/006* (2013.01); *F21V 3/0463* (2013.01); *F21V 3/0427* (2013.01); *F21Y 2101/02* (2013.01)
USPC ............................ 362/601; 362/603; 362/606

(58) Field of Classification Search
USPC ................................ 362/601–603, 606–609, 362/311.01–311.06, 307, 308, 327–329, 362/235, 244, 246, 551, 555
See application file for complete search history.

(56) References Cited

U.S. PATENT DOCUMENTS

| | | | | |
|---|---|---|---|---|
| 4,667,278 | A * | 5/1987 | Poyer | 362/267 |
| 4,763,233 | A * | 8/1988 | Poyer | 362/477 |
| 5,692,822 | A * | 12/1997 | Dreyer | 362/552 |
| 7,938,560 | B2 * | 5/2011 | Hsu | 362/243 |
| 8,231,256 | B1 * | 7/2012 | Coleman et al. | 362/601 |

* cited by examiner

*Primary Examiner* — Bao Q Truong

(57) ABSTRACT

A novel light fixture comprises a light source, a collimating element, an optical cavity and a multi-functional non-imaging optical component to control light distribution. The present invention provides a system and method of controlling the output of light from a light fixture. One or more volumetric anisotropic diffusing components can be utilized to control both the photometric distribution and visual appearance of the light fixture. A high degree of optical control is obtained with durable components that can be easily customized to optimize optical performance in light fixtures designed as pendants, wall sconces, wallwashers, downlights, and tasklights. The luminance and color uniformity as well as the illuminance and color uniformity of illumination can be controlled and improved.

14 Claims, 9 Drawing Sheets

LIGHT FIXTURE COMPRISING A MULTI-FUNCTIONAL NON-IMAGING OPITICAL COMPONENT

RELATED APPLICATIONS

This application claims the benefit of priority under 35 U.S.C. 119(e) to pending U.S. non-provisional application Ser. No. 12/030,203 itself claiming priority to provisional No. 60/889,525, filed on Feb. 2, 2007, the entire contents of which is incorporated herein by reference.

FIELD OF THE INVENTION

The invention relates to light fixtures, luminaires, lamps, or other light emitting devices used for illumination. The system and methods are particularly applicable to collimated light sources such as incandescent and discharge lamps with parabolic reflectors or solid state lighting sources. The system and methods are also particularly effective with arrays of light sources such as those often used in solid state lighting.

BACKGROUND

The invention relates to improved performance of light fixtures. Light fixtures are also commonly referred to as luminaires and represent a complete lighting unit consisting of a lamp(s) electrical controls (when applicable), together with the parts designed to distribute the light, to position and protect the lamps, and to connect the lamps to the power supply. Additionally, a light fixture converts a light source into an illuminated object that may be viewed directly and should contain optical technology to make this a pleasant experience for humans. Often this requires diffusing or re-directing light in order to reduce the brightness of a light source or create a larger or more uniform light emitting surface.

For most lighting applications, principal functions of a light fixture are to aesthetically modify the appearance of light sources and to control the distribution of emitted light. A number of optical components such as diffusers, lenses, reflectors, and louvers are commonly used for these purposes. Often times, collimation of light is desirable to reduce the beam angle output of a luminaire in order to increase the intensity of projected light. Narrow beam outputs are commonly created by the use of parabolic reflectors that are commonly used with incandescent, fluorescent, and metal halide lamps. Narrow beam angle LED light sources are commonly created through combinations of primary and secondary optics. In many cases, a polymer material is used as an encapsulant of the LED chip and forms a domed lens. Injection molded secondary optics that further collimate the light output of an LED package are also commonly used. Some of these are parabolic type reflectors and others use total internal reflection (TIR) to redirect light and collimate light. Typical collimating optical components creates a desirable increase in intensity within the beam angle but also boost peak brightness of a luminaire and create high contrast background for the eye, creating objectionable glare and impairing vision. Most standard collimating optical elements produce a symmetrical beam angle output. Asymmetrical collimating components exist but require significant technical expertise and time to design. Additionally, collimating components are typically manufactured by injection molding and the time and expense of producing accurate tooling for injection molding is significant. A particular asymmetrical collimating component is limited in use to providing a very specific optical output when coupled to a very specific light source. Therefore, when developing a product line of commercial luminaires it is advantageous for a luminaire manufacturer to utilize pre-existing standard collimating optical components or design as few custom collimating optics as possible.

DETAILED DESCRIPTION

Figure 1:
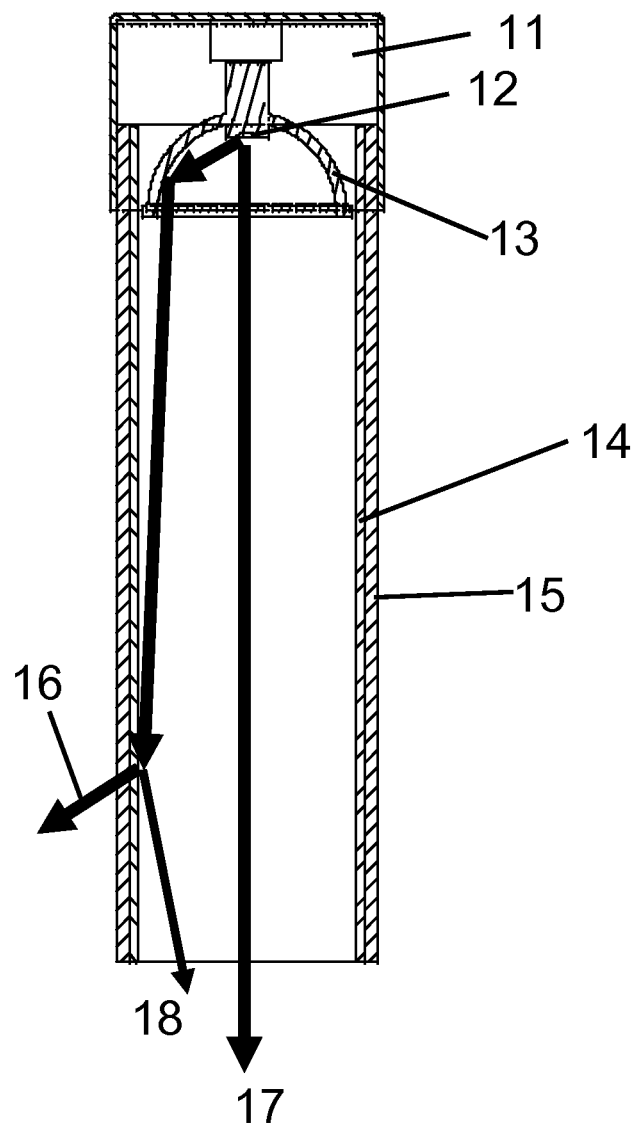
FIG. 1 is a side view of a pendant light fixture and represents an embodiment of the invention.

The features and other details of particular embodiments of the invention will now be more particularly described. It will be understood that particular embodiments described herein are shown by way of illustration and not as limitations of the invention. The illustrations are not drawn to scale in order to illustrate particular features and properties. The principal features of this invention can be employed in various embodiments without departing from the scope of the invention. All parts and percentages are by weight unless otherwise specified.

DEFINITIONS

For convenience, certain terms used in the specification and examples are collected here.

"Diffuse" and "diffusing" as defined herein includes light scattering or diffusion by reflection, refraction or diffraction from particles, surfaces, or layers or regions.

"Diffuser Plate" and "Diffuser Film" and "Diffuser" are referred to herein as optical elements that provide a scattering or diffusion property to one or more light rays. The change in angle of a light ray may be due to refraction, internal forward and backward scattering, or diffraction. As suggested here a diffuser plate (or film) may be thin and may incorporate many layers or regions providing different properties. A diffuser plate may incorporate other features or materials in the volume or on one or more surfaces that impart a desired optical, thermal, mechanical, electrical, or environmental performance.

"Optical throw" as defined herein refers to the linear distance from the light fixture or light source to the region with the largest illuminance in the illumination pattern.

"Optically coupled" is defined herein as condition wherein two regions or layers are coupled such that the intensity of light passing from one region to the other is not substantial reduced by Fresnel interfacial reflection losses due to differences in refractive indices between the regions. "Optical coupling" methods include methods of coupling wherein the two regions coupled together have similar refractive indices or using an optical adhesive with a refractive index substantially near or in-between the regions or layers. Examples of "Optical coupling" include lamination using an index-matched optical adhesive, coating a region or layer onto another region or layer, or hot lamination using applied pressure to join two or more layers or regions that have substantially close refractive indices. Thermal transfer is another method that can be used to optically couple two regions of material.

"Anisotropic ratio" as defined herein refers to the ratio between the FWHM diffusion angle in the machine direction of a diffuser film and the FWHM diffusion angle in the axis perpendicular to the machine direction.

"See through" as defined herein refers to the phenomenon that can be described differently depending on the context. When one refers to scattering or diffusion in a diffractive sense, one can speak of diffraction orders, although for traditional symmetric and asymmetric diffusive mediums the non-zero diffractive orders do not have well-defined angular ranges. However, one can refer to the un-deviated light as the zero order when passing through a diffuser. One may refer to "see through" as the zeroth ordered light that is un-scattered or un-diffracted after passing through a diffusing medium. A perfectly clear film will be referred to as having significant see-through and a hazy film will be referred to as having little or no see-through. See through is also commonly referred to as specular transmission.

"Clarity" is defined as the ratio of the amount of unscattered light to transmitted light expressed as a percentage using a ring sensor at the exit port of a haze meter as defined by ASTM D1003 standard and BYK documentation referring to Transmission, Haze, and Clarity definitions. The relation between the amount of unscattered light (IC-IR) and transmitted light (IC+IR) is expressed in percentage or $$\text{Clarity} = 100\% \cdot \frac{(IC - IR)}{(IC + IR)}$$

where the light intensity in the inner ring is IC and the intensity of the light in the outer ring sensor is IR. Clarity generally refers to the amount of low-angle scattered light. It is used here as one metric to quantify "see through." The Clarity measurement effectively describes how well very-fine details can be seen through the optical element. The see-through quality is determined in an angle range smaller than 2.5 degrees and the measurement of clarity depends on the distance between sample and observed object.

"Uniformity" is defined as one minus the standard deviation divided by the arithmetic average of the values. An ideal sample with perfect uniformity will have a uniformity value of 1.

"Illumination Uniformity" is defined as the uniformity of the illuminated area.

"Illuminated area" is defined as the area enclosed by the boundary where the intensity of the illumination falls to 50% of its peak value.

"Hot spot" refers to local fluctuations that have significant luminance differences (contrast) between two neighboring regions.

DETAILED DESCRIPTION

In one embodiment of this invention, a light fixture comprises a light source, a collimating element, an optical cavity and a multi-functional non-imaging optical component (MNOC) comprising an anisotropic light scattering film. In another embodiment of this invention, the MNOC further comprises a surface relief feature which redirects a portion of the incident light.

Backward Scattering

In one embodiment of this invention, a volumetric anisotropic scattering diffuser with scattering properties in the backwards direction is used to further increase the uniformity of the light fixture in a spatial, radial, or linear pattern. In a further embodiment, the backscattering is substantially isotropic to provide improved uniformity along at least two spatial axes and increases the illumination uniformity or preferentially scatter light within one or more planes to provide more even illumination of a wall. In one embodiment, the scattering is anisotropic such that light is scattered backward with a larger FWHM in a plane parallel to the optical axis than within a plane perpendicular to the optical axis. In a particular embodiment, the asymmetry ratio (the ratio of the full-width-half maximums) of the light scattered backward is greater than 2. In a further embodiment, the ratio is greater than 10. In an additional embodiment, the ratio is greater than one selected from the following group consisting of 50, 80, 100. In one embodiment, the scattering is anisotropic such that light is scattered backward with a larger FWHM in a plane perpendicular to the optical axis than within a plane parallel to the optical axis.

In a further embodiment, the diffuse reflectance (specular component excluded) is greater than 5%. In a further embodiment, the diffuse reflectance is greater than one chosen from the group consisting of 10%, 20%, 50%, 75%.

Light Profile Incident on Anisotropic Diffuser

In one embodiment of this invention, the light incident on an anisotropic diffuser is substantially collimated. The light may be collimated by primary optics such as a reflector cup or encapsulant, secondary optics such as the molded plastic lenses or reflective plastic optics, or through the use of photonic crystalline structures on an LED die or through the use of laser diodes or other substantially collimated light sources. In one embodiment, the degree of collimation is 5 degrees FWHM. In a further embodiment, the collimation is one selected from the group consisting of 10 degrees, 20 degrees, 30 degrees, 60 degrees, 100 degrees, or 120 degrees. When the light source is substantially collimated, the light can be directed such that a pre-determined amount of the light does not pass through the anisotropic diffuser and illuminates in a spot-like pattern for applications such as spot-lighting or pendant light fixture, down-lighting, or track-lighting applications.

Surface Features

In one embodiment of this invention, a surface with relief features is disposed near the volumetric anisotropic scattering region. Example surface relief features includes a prismatic film, microlens array, and other surface relief features and it can be optically coupled to the anisotropic diffuser or embossed directly into or upon. These features can increase the off-axis intensity at an angle larger from the optical axis within one or more planes. In a further embodiment, the incident light is directed through a total angle larger than one selected from the group consisting of 10 degrees, 30 degrees, 45 degrees, 60 degrees, 90 degrees, 120 degrees, 160 degrees. More than one surface feature region may be used. In a further embodiment, the optical efficiency of the system is increase through the use of surface relief features to the increased coupling into the film due to the reduced angle of incidence. In one embodiment, the transmission of the surface relief region is greater than one selected from the group consisting of 80%, 85%, 90%, 94%, 96% as measured according to ASTM D1003 with the light incident on the relief surface. In one embodiment, the transmission of the surface relief region combined with the volumetric anisotropic region is greater than one selected from the group consisting of 70%, 80%, 85%, 90%, 94%, 96% as measured according to ASTM D1003 with the light incident on the relief surface.

Improved Light Fixture Properties

In one embodiment, the spatial luminance uniformity is increased. This uniformity, measured as % non-uniformity, may be less than 70%, 50%, 30%, 20%, 10%, or 5%. In another embodiment, the spatial luminance uniformity is greater along one axis than a second axis. The asymmetric uniformity can allow increased optical efficiency by reducing the un-necessary diffusion for elements, components, or fixtures that are linear or other predetermined shape. This can create fixtures with increased spatial luminance along a predetermined axis, thus making the component or system more efficient due to the more efficient control of light delivery. In a further embodiment, the uniformity of illumination when using substantially collimated light sources is greatly increased. Similarly as above, the spatial luminance color uniformity can be improved when using non-uniform color light sources or arrays of light sources such as red, green and blue LED's. In one embodiment, the spatial luminance color uniformity is increased such that the Δu'v' (calculated according to VESA flat panel display measurement Standard Version 2.0) is less than 0.2 across the angular profile containing the FWHM of illumination. In a further embodiment, the Δu'v' is less than one selected from the group consisting of 0.1, 0.04, 0.02, 0.01. The uniformity of a fixture using a two-dimensional array of light sources that would normally have a two-dimensional non-uniformity pattern can be improved to have increased luminance or color uniformity along one or more axes. In one embodiment, the non-uniformity asymmetry ratio (measured by the ratio of the non-uniformities) is less than 2 or 5 or 10 or 30 or 50 or 80 for either the luminance non-uniformity or the ratio of the Δu'v' along two axes.

In a further embodiment of this invention, the illuminance uniformity is increased. The illuminance uniformity, measured as % non-uniformity, may be less than 70%, 50%, 30%, 20%, 10%, or 5%. In another embodiment, the illuminance uniformity is greater along one axis than a second axis. The asymmetric illuminance uniformity can allow increased optical efficiency by reducing the un-necessary diffusion for elements, components, or fixtures that are linear or other predetermined shape. This can create fixtures with increased luminance along a predetermined axis, thus making the component or system more visible and have regions of increased luminance. In a further embodiment, the uniformity of a fixture using a two-dimensional array of light sources that would normally have a two-dimensional non-uniformity pattern can be improved to have increased uniformity along one or more axes. In one embodiment, the non-uniformity asymmetry ratio (measured by the ratio of the non-uniformities) is less than 2 or 5 or 10 or 30 or 50 or 80.

The illuminance color uniformity can be improved when using non-uniform color light sources or arrays of light sources such as red, green and blue LED's. In one embodiment, the illuminance color uniformity is increased such that the Δu'v' (calculated according to VESA flat panel display measurement Standard Version 2.0) is less than 0.2 across the angular profile containing the FWHM of illumination. In a further embodiment, the Δu'v' is less than one selected from the group of 0.1, 0.04, 0.02, and 0.01. The color uniformity of a fixture using a two-dimensional array of spatially varying colored light sources that would normally have a two-dimensional non-uniformity pattern can be improved to have increased luminance or color uniformity along one or more axes. In one embodiment, the non-uniformity asymmetry ratio (measured by the ratio of the non-uniformities) is less than 2 or 5 or 10 or 30 or 50 or 80 for either the luminance non-uniformity or the ratio of the Δu'v' along two axes.

Air-Base Waveguide

In one embodiment of this invention, an air-based waveguide is utilized with a volumetric diffuser in order to provide increased transmission through the waveguide and reduced component cost and weight. In a further embodiment, more light is directed along the optical axis from the light source due to reflections off of the polymer based structure or matrix due to a higher refractive index. In one embodiment, the refractive index greater than 1.48 or 1.53 or 1.587 or 1.67 such that a more significant grazing incidence reflection occurs. In a further embodiment of this invention, the air-based waveguide reduces the percentage of light transmitted into a film or component by increasing the reflectance. As a result, the component can provide controlled transmission as well as controlled reflection. In one embodiment, the increased reflection re-directs a portion of the incident light such that the uniformity is increased along one or more axes, planes, or within a predetermined region of the surface emitting area of the fixture or solid angle of illumination.

Off-Axis Light Redirection

In one embodiment of this invention, the light is incident at an angle onto the light redirecting component comprising a volumetric anisotropic diffuser such that a virtual image of the source is created. The image can be created by surface relief features, or volumetric anisotropic diffusion such that the high luminance along one or more axis suggests that the light emitting source is directly behind the component when viewed. As a result, the fixture has the appearance of an increased luminance light fixture. In one embodiment, the anisotropic diffuser scatters light such that the light is re-directed by an greater than one selected from the group of 10 degrees, 20 degrees, 40 degrees, 60 degrees, 90 degrees, 120 degrees.

Radial Light Re-Direction

In one embodiment of this invention, an anisotropic volumetric diffuser is used to scatter the incident light along a radial direction by using either a curved anisotropic region or a curved light source or array of light sources. In one embodiment, the anisotropic diffuser is positioned and shaped such that it is substantially parallel to the major optical axis. Typically, incident light from substantially collimated sources reaching an anisotropic diffuser will scatter light into an illumination pattern that is not symmetric or spatially uniform. The radial symmetry from the radial output of the light source and the radial symmetry of the curved anisotropic diffuser can create a more symmetric, and optically efficient light output pattern. Similarly, a curved array of light sources used with a curved anisotropic volumetric diffuser can create an efficient light pattern of a desired shape or a desired spatial luminance pattern.

Clarity

In one embodiment of this invention, the clarity of the MNOC is improved such that the optical transmission is increased and the virtual image has increased clarity. The clarity can be greater than 20%, 50%, 70%, 90% or 95%.

Examples

The pendant light fixture of FIG. 1 contains 3 primary optical components utilized in providing control of light distribution in 3 axes; x, y, and z. The substantially collimated light source 11 is created from the LED 12 and the collimating reflector 13. The multi-functional non-imaging optical component 14 is disposed in a cylindrical shape parallel to the optical axis and is contained within a transparent support tube 15. The collimated light source may have a beam angle of less than 120 degrees. Illustrated in the drawing is an MR16 lamp containing multiple LEDs with beam angles of ten degrees. Versions of MR-16 lamps are commercially available with a wide range of beam angles, both with LED light sources utilizing primary and/or secondary optic collimating lenses or as incandescent (including halogen) light sources with parabolic type reflectors for collimation. MR-16 lamps are well suited for pendant fixtures as they provide a small point light source and their standard package size of lamp plus reflector is approximately 2 inches in diameter.

Figure 2:
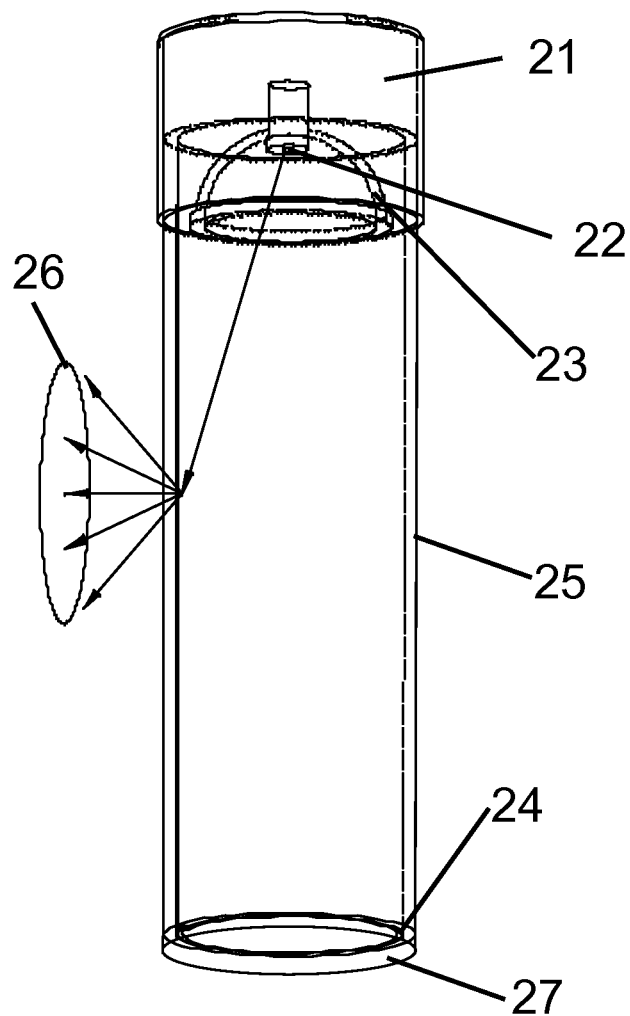
FIG. 2 is an angled view of a pendant light fixture and represents an embodiment of the invention.

The Multifunctional Nonimaging Optical Component (MNOC) 14 performs multiple functions, including but not limited to control over the luminance of the fixture as well as the illumination output (illuminance). It can contain surface relief features on one or more surfaces, may be a combination of optical films and may contain volumetric anisotropic or isotropic optical regions or components. Volumetric anisotropic diffusers, the different types and methods of creation are described in U.S. patent application Ser. Nos. 11/282,551 and 60/870,262, the entire contents of which are incorporated herein by reference. The MNOC may function as an air-core waveguide designed to internally reflect light 18 along the optical path. This light 18 combines with the direct light 17 from the substantially collimated source 11 to contribute to the light directed downwards. The portion of the light 16 incident on the MNOC that is anisotropically scattered into larger angles from the optic axis provides output radial to the optical path of the collimated light source(s) which can be controlled in intensity and distribution orientation by the use of a diffuser. The diffuser may have asymmetric properties that not only control the photometric distribution of light from the fixture but also control the visual appearance of the light fixture. The illustrated example of FIG. 1 contains a highly asymmetric volumetric diffusing film with anisotropic beam angles of approximately 50 to 1 as measured with an essentially perfectly collimated green laser light source of 532 nm wavelength. In this embodiment the diffuser is oriented with the larger diffusion axis oriented parallel to the optical path. In this orientation, light 16 that exits radially is preferentially scattered in an upward and downward orientation. This is also illustrated in the embodiment of FIG. 2 by an angled view. The substantially collimated light source 21 is created from the LED 22 and the collimating reflector 23. The first multi-functional non-imaging optical component 24 is disposed in a cylindrical shape parallel to the optical axis (similar to 14 in FIG. 1) and is contained within a transparent support tube 25. The anisotropically scattered light profile 26 creates increases the linear uniformity while providing illumination from the fixture into larger angles from the optical axis. This is useful in providing more uniformly lighting a space, reducing contrast caused by light and dark zones of illumination, and reducing glare. In this embodiment the diffuser is in the form of a polymer film which is curled into a cylinder shape and fitted inside a clear polymer tube. Alternatively, the clear tube can be eliminated and the diffuser film itself can form a desired waveguide shape. The shape of the waveguide is illustrated as an open ended cylinder but a number of other shapes substantially tubular in nature are possible such as rectangular tubes, curved tubes, and tubes deviating in direction from the center of the optical path. Other forms and methods for created the shape during the production or post forming of the diffuser can be used such as those understood in the polymer and plastic forming industry. Varying the shape and dimensions of the MNOC provides control of the light output of the fixture. The diameter or length of the component can increased to provide tailored optical luminance or color properties or specific illuminance properties.

The asymmetric diffusion properties of the MNOC 14 create a unique visual image when viewed as part of the light fixture. The image of the light source(s) is extended along the optical path, appearing more tightly concentrated along the centerline of the MNOC 14 as the distance from the light source increases (tapers if off-axis). Asymmetric diffusers with extremely low diffusion in one axis provide the MNOC 14 with substantially high clarity enabling the interior of the MNOC to be visible but appearing stretched in one dimension. If multiple light sources are used each form creates a separate image. If multicolor LEDs are used, each LED creates a separate linear image of differing color providing a useful aesthetic effect for some applications.

In one embodiment of this invention, more than one MNOC is used to provide a specific light output distribution. Additional lenses or MNOC's may optionally be added anywhere along the optical path to further control the light distribution and appearance of the light fixture. As illustrated in FIG. 2, a second MNOC 27 positioned at the end of the tube 25 farthest from the light source to serves not only as an optical lens but an end cap for the tube 25 to prevent dust and internal contamination. In the illustrated embodiment of FIG. 2 this MNOC 25 may contain an anisotropic diffuser to provide beam shaping of the light output that propogates the entire length of the tube 25. A lens positioned at the other end of the tube 25 closest to the collimated light source 21 can be used to control the image of the light source that become asymmetrically elongated in appearance by the MNOC 27. This gives greater control over the visual appearance of the light fixture and improves the light output pattern while providing a controlled increase in uniformity in a linear direction parallel to the tube 25.

Figure 3:
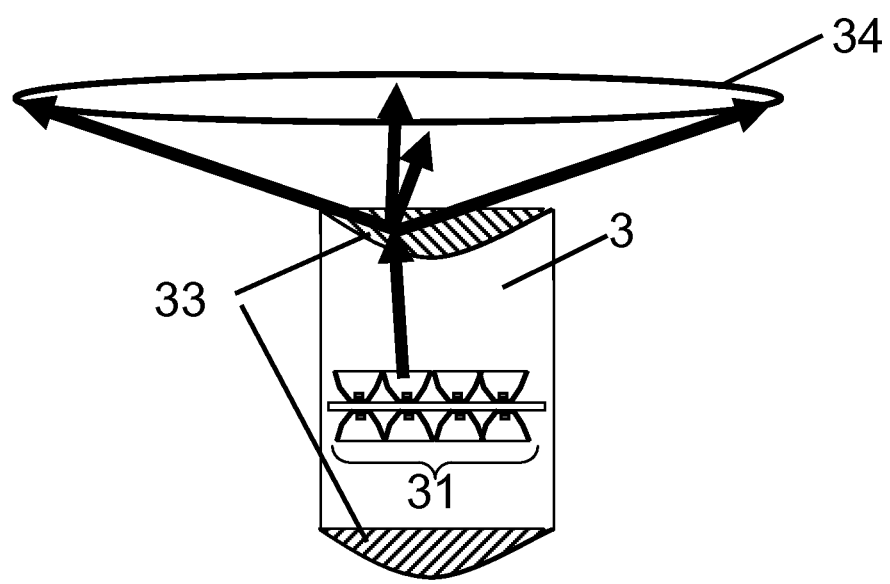
FIG. 3 is a view of a wall sconce light fixture and represents an embodiment of the invention.

The wall sconce light fixture of FIG. 3 contains components utilized in providing control of light distribution in 3 axes; x, y, and z. Light from a linear array of LED's 32 is incident on the major wall surface of the sconce 32 and the top and bottom surfaces containing MNOC's 33. The desired optical output of a wall sconce varies depending on specific application but the illustrated example is configured to provide distributions generally useful in wallwashing type applications. Two sets of optical systems are shown oriented with optical paths facing in opposite directions. These can be substantially different to provide unique and differentiated products.

Figure 4:
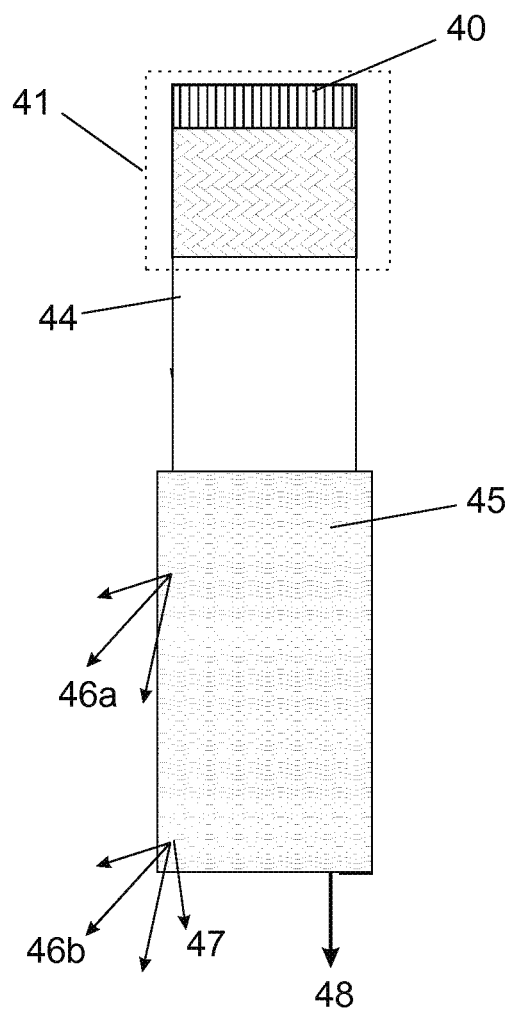
FIG. 4 is a side view drawing of a pendant light fixture configured as an embodiment of the invention.
Figure 5:
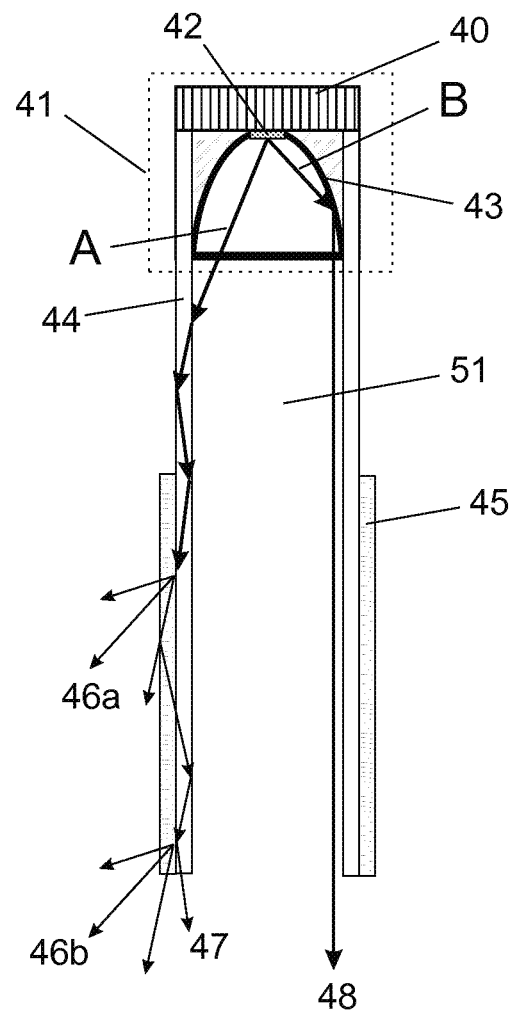
FIG. 5 is a cross-section side view drawing of the same pendant light fixture embodiment as shown in FIG. 4.

FIG. 4 and FIG. 5 show a pendant light fixture embodiment with a LED light source 42 within a collimating light source 41 in which the light redirecting region 45 is optically coupled to a light transmissive wall 44 with a portion of the light transmissive wall having no optical coupling to the light transmissive wall. In the uncoupled section, light from example optical path A enters the light transmissive wall and is propagated within the light transmissive wall by total internal reflection. When the light enters a light redirecting region, a portion of the light is scattered and exceeds the critical angle of total internal reflection, causing a light outcoupling portion 46a to outcouple out of the light fixture. Some of the light continues to propagate by internal reflection and subsequently outcouples in a different area of the light redirecting region, for example the light outcoupling portion 46b. A portion of the light on example optical path A propagates out the end of the light transmissive wall as light output portion 47. Light on example light path B is reflected within the collimating light source 41 and then propagates through the optical cavity 51 without further reflection and outputs as example light output portion 48. In one embodiment, the light redirecting region is applied to the light transmissive wall as a coating of comprising regions of differing index of refraction. The light transmissive wall can be comprised light transmitting material such as optically clear polymer or glass. Acrylic, polycarbonate, polyurethane, and silicone are example of common optically clear polymers.

Figure 6:
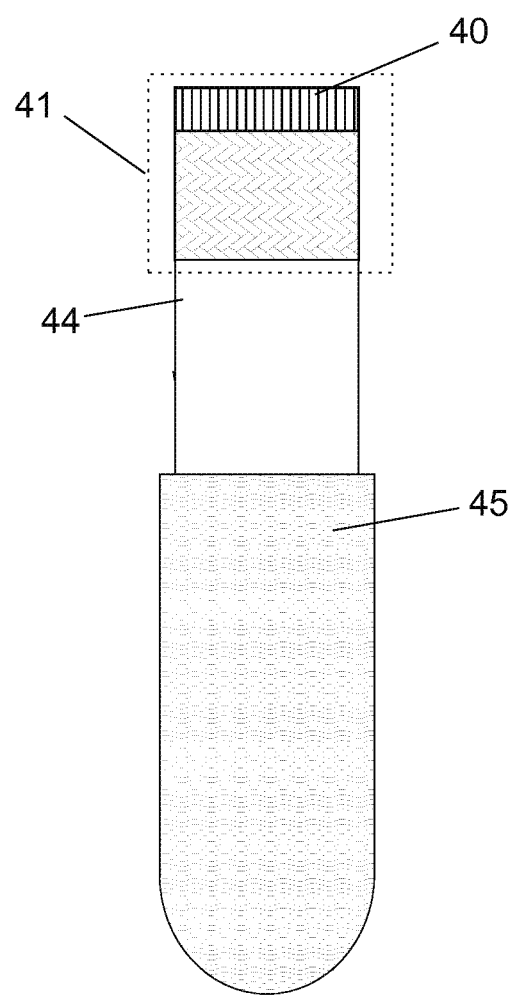
FIG. 6 is a side view drawing of a bulb-like embodiment feasible for use as a downlight or pendant light fixture.
Figure 7:
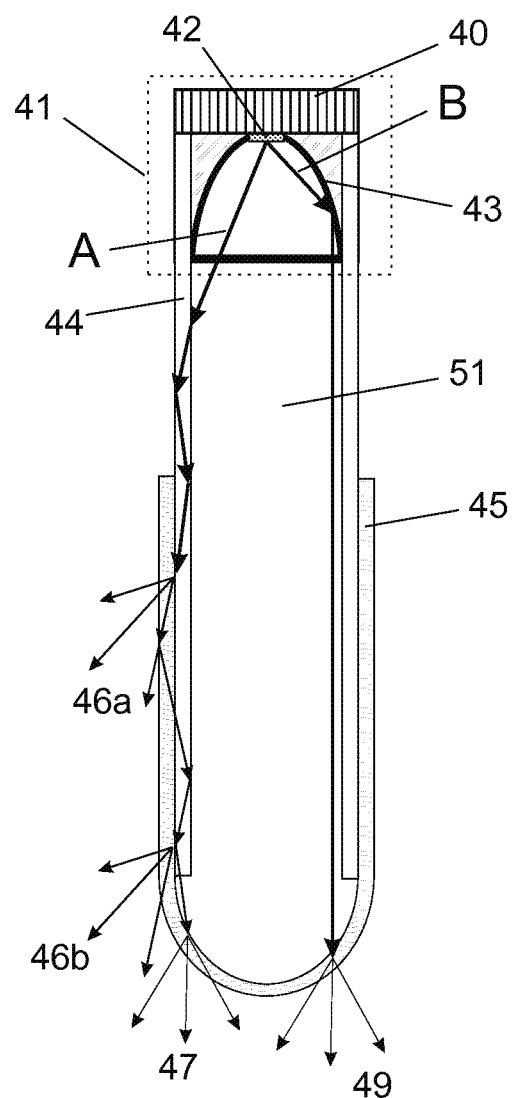
FIG. 7 is a cross-section side view drawing of an embodiment with the same exterior side view as shown in FIG. 6.

FIG. 6 and FIG. 7 show a light fixture embodiment feasible for use as either a downlight or a pendant. The light transmissive wall 44 forms a bulb shape. A LED light source 42 is located within a collimating light source 41. The light redirecting region 45 is optically coupled to a light transmissive wall 44 with a portion of the light transmissive wall having no optical coupling to the light transmissive wall. In the uncoupled section, light from example optical path A enters the light transmissive wall and is propagated within the light transmissive wall by total internal reflection. When the light enters a light redirecting region, a portion of the light is scattered and exceeds the critical angle of total internal reflection, causing a light outcoupling portion 46a to outcouple out of the light fixture. Some of the light continues to propagate by internal reflection and subsequently outcouples in a different area of the light redirecting region, for example the light outcoupling portion 46b. A portion of the light on example optical path A propagates out the end of the light transmissive wall as light output portion 47. Light on example light path B is reflected within the collimating light source 41 and then propagates through the optical cavity 51 without further reflection and outputs as example light output portion 49 after diffusing in the light redirecting region. In one embodiment, the light redirecting region is applied to the light transmissive wall as a coating of comprising regions of differing index of refraction. The optical cavity 51 is typically filled with air but other light transmissive gases or a vacuum are possible substitutes.

Figure 8:
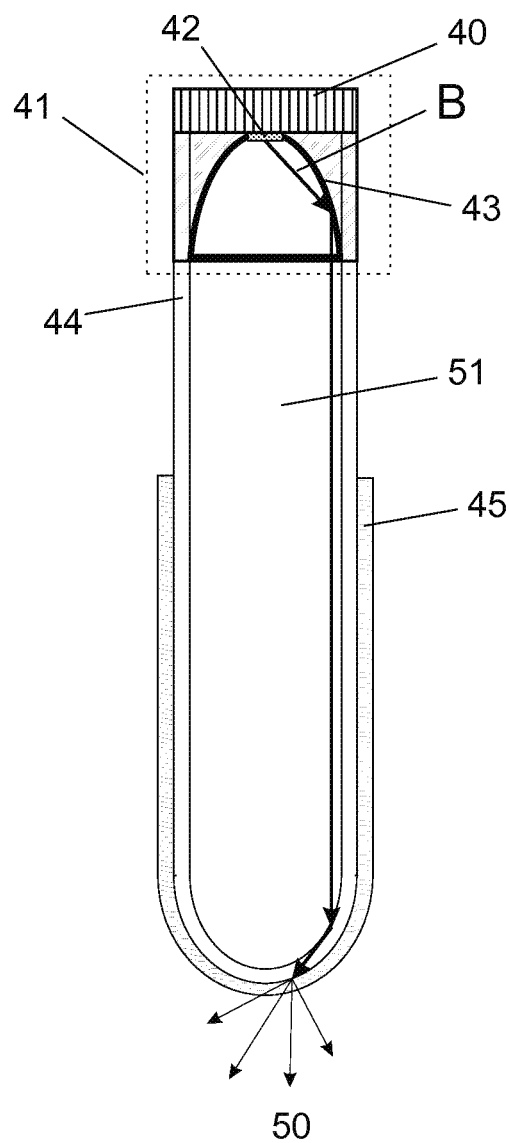
FIG. 8 is an cross-section side view drawing of an alternative embodiment with the same exterior side view as shown in FIG. 6.

FIG. 8 shows an alternative embodiment of FIG. 6 and FIG. 7 in which the light transmissive wall forms a bulb shape which provides some light guiding effect on light output portion 50.

Figure 9:
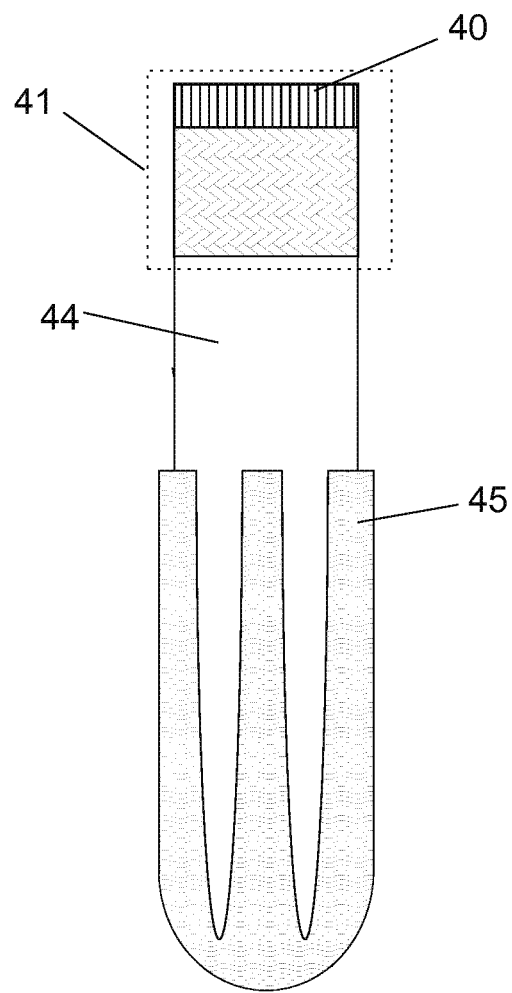
FIG. 9 is an alternative downlight or pendant embodiment with a patterned light scattering region.

FIG. 9 shows an alternative embodiment in which the light redirecting region optically coupled to the light transmissive wall is patterned. This can be done for aesthetic reasons, to provide more uniform luminance, or to give further control of light distribution output.

What is claimed is:

1. A light fixture comprising:
   a) at least one light emitting source;
   b) at least one light collimating element disposed to receive light originating from the light source with a first angular full-width at half maximum intensity profile within a first input plane and redirect the light into a second angular full-width at half maximum intensity profile wherein the second angular full width is less than the first angular full width; and
   c) an optical cavity into which light from the light collimating element is input; and
   d) a light transmissive wall substantially parallel to the optical axis of the light collimating element output, wherein a face of said light transmissive wall adjacent to the optical cavity acts as an input surface and a portion of light within light transmissive wall is internally reflected to act as a lightguide; and
   e) a light redirecting region optically coupled to light transmissive wall which causes light to exceed the critical angle of internal reflection and outcouple from the light transmissive wall.

2. The light fixture of claim 1 wherein the light transmissive wall is in the form of a cylinder shape.

3. The light fixture of claim 1 wherein the light transmissive wall is in the form of a bulb shape.

4. The light fixture of claim 1 wherein the optical cavity if filled with a gas.

5. The light fixture of claim 4 wherein the gas comprised of air.

6. The light fixture of claim 1 wherein the light redirecting region comprises a light scattering blend of materials having differing indices of refraction.

7. The light fixture of claim 1 wherein the light redirecting region is applied to the light transmissive coating as a wall.

8. The light fixture of claim 1 wherein the light redirecting region comprises an asymmetric light scattering material.

9. The light fixture of claim 1 wherein the light redirecting region comprises surface features to redirect light out of the transmissive wall.

10. The light fixture of claim 1 wherein some light originating from the light source is input into a portion of the light transmissive wall and internally reflects without entering a light redirecting region.

11. The light fixture of claim 1 wherein the light transmissive wall is comprised of polymer.

12. The light fixture of claim 1 wherein the light transmissive wall is comprised of glass.

13. The light fixture of claim 1 wherein the light redirecting region is optically coupled to the light transmissive wall in a non-continuous pattern.

14. The light fixture of claim 13 wherein the non-continuous pattern is used to control light distribution of the light fixture.

* * * * *